Patented Dec. 26, 1922.

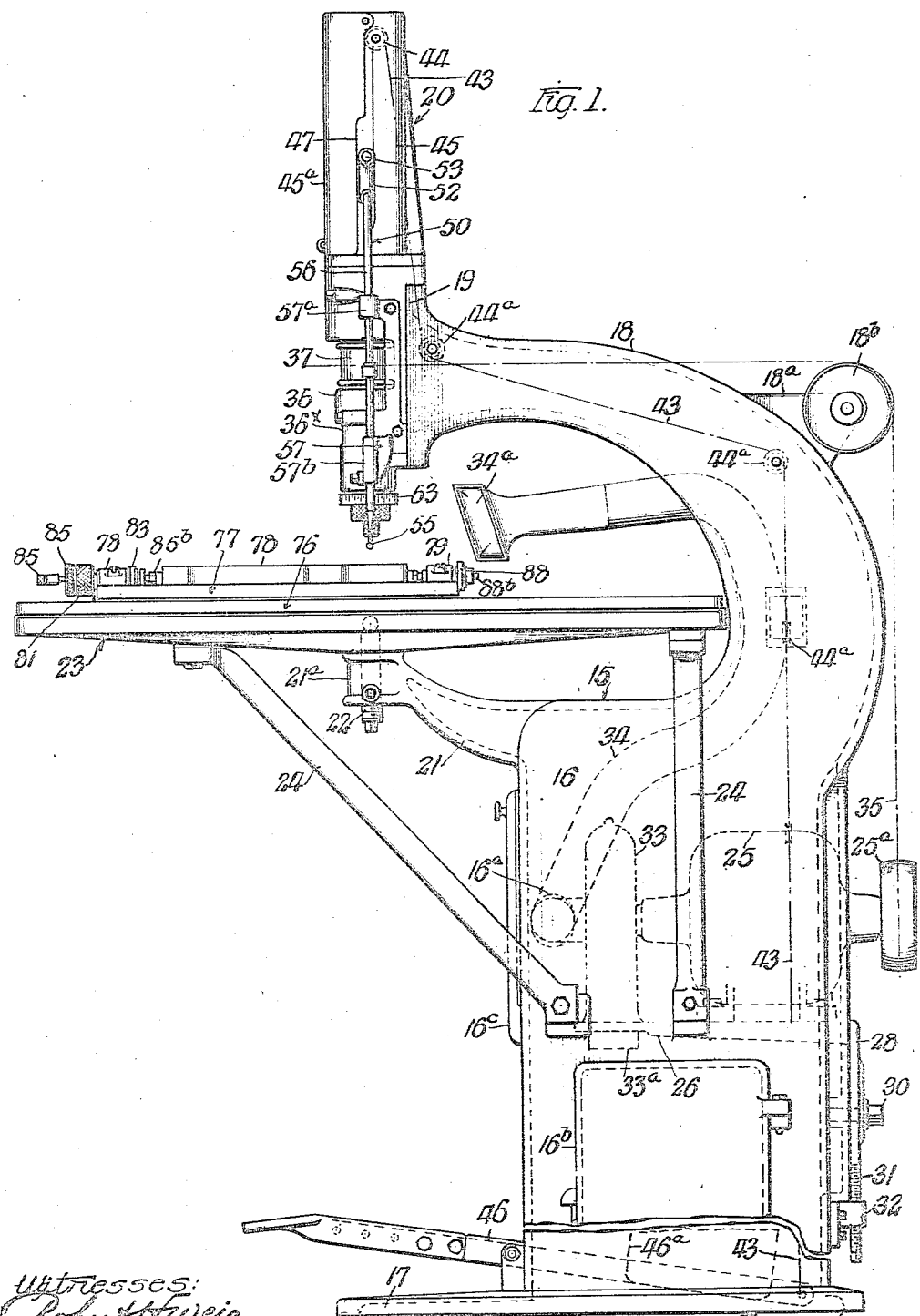

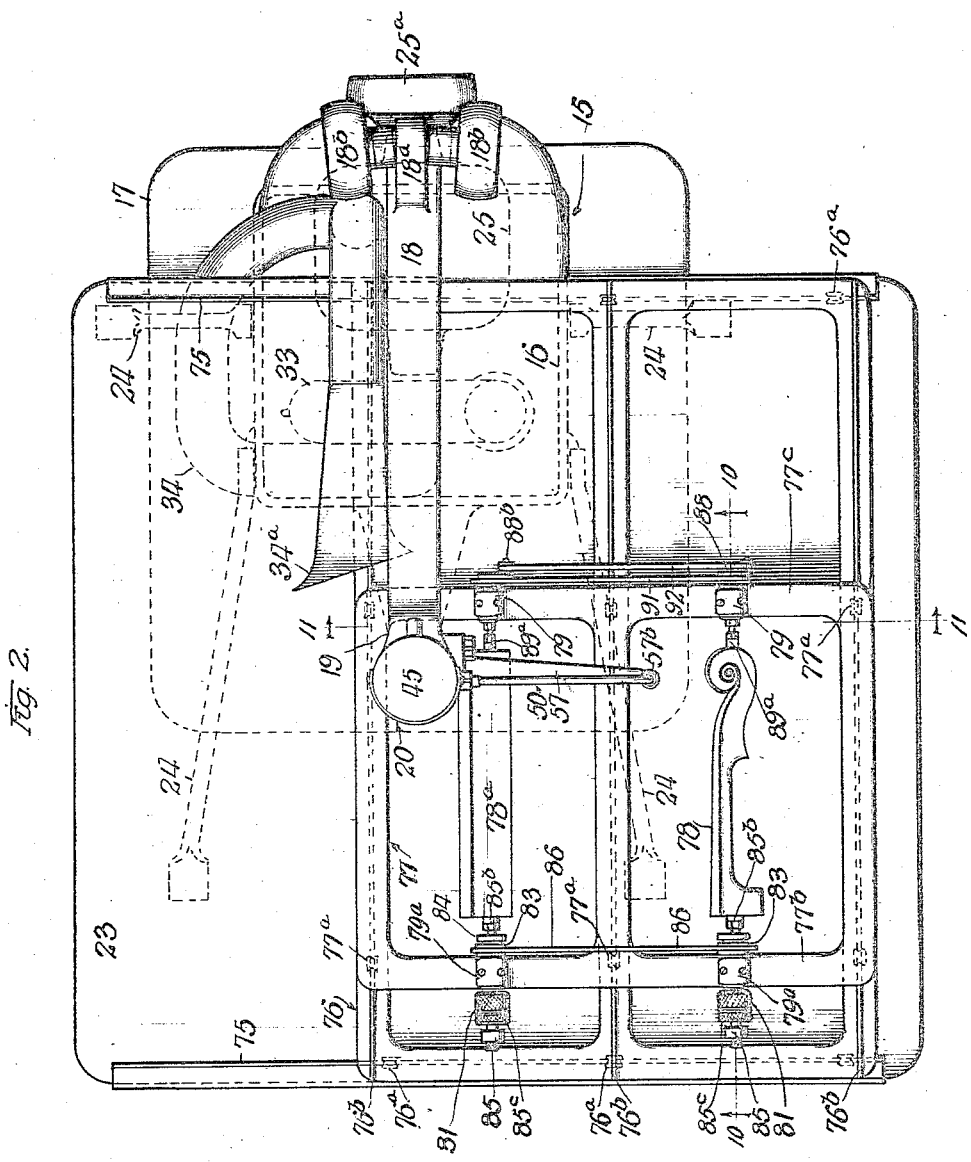

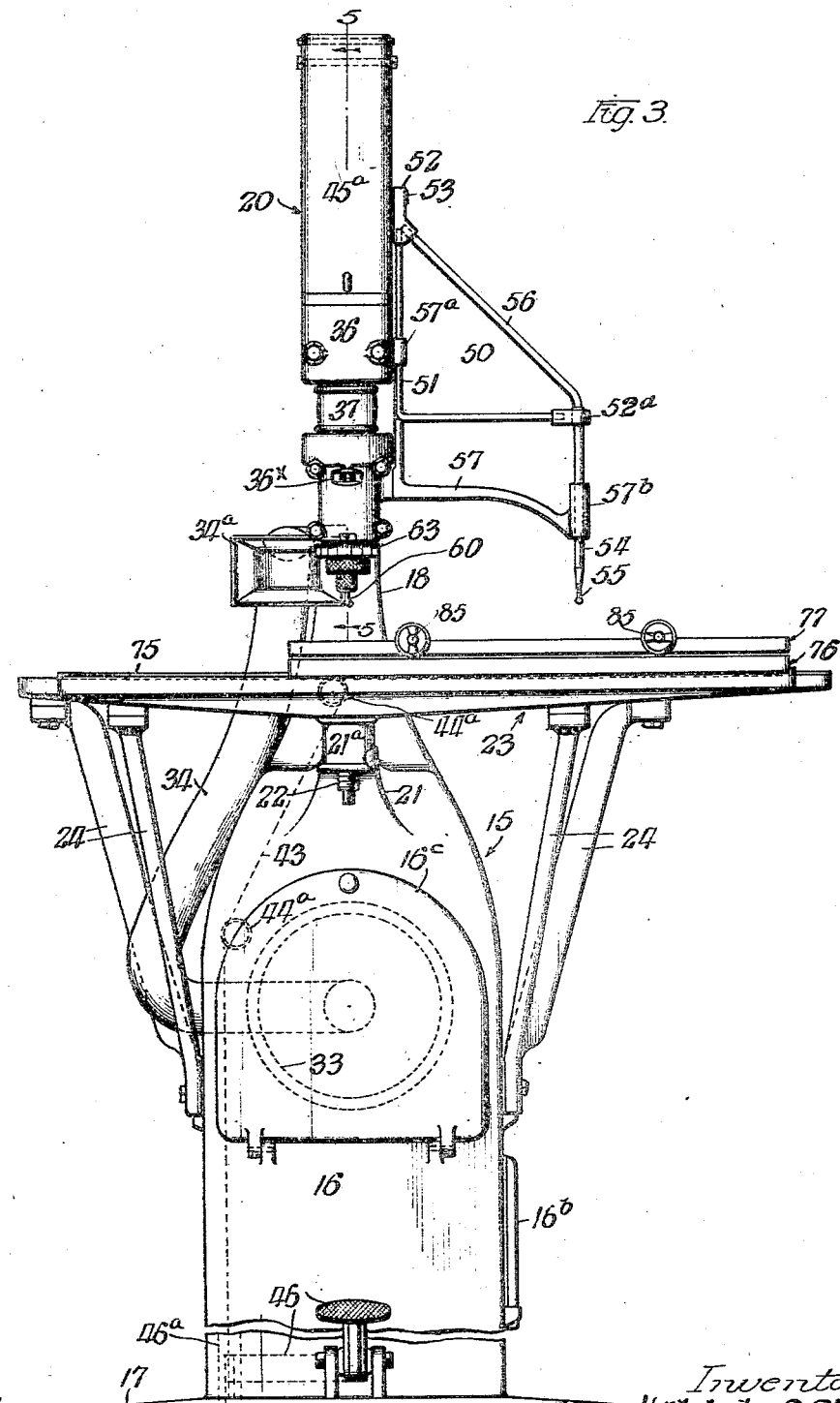

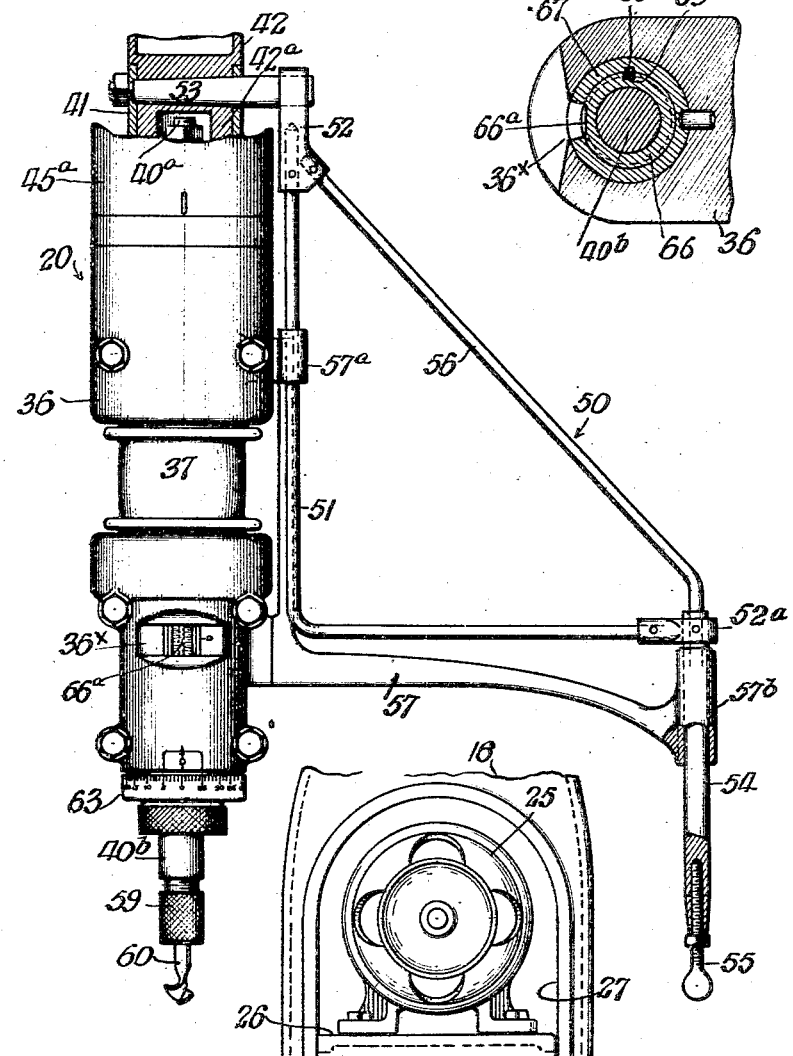

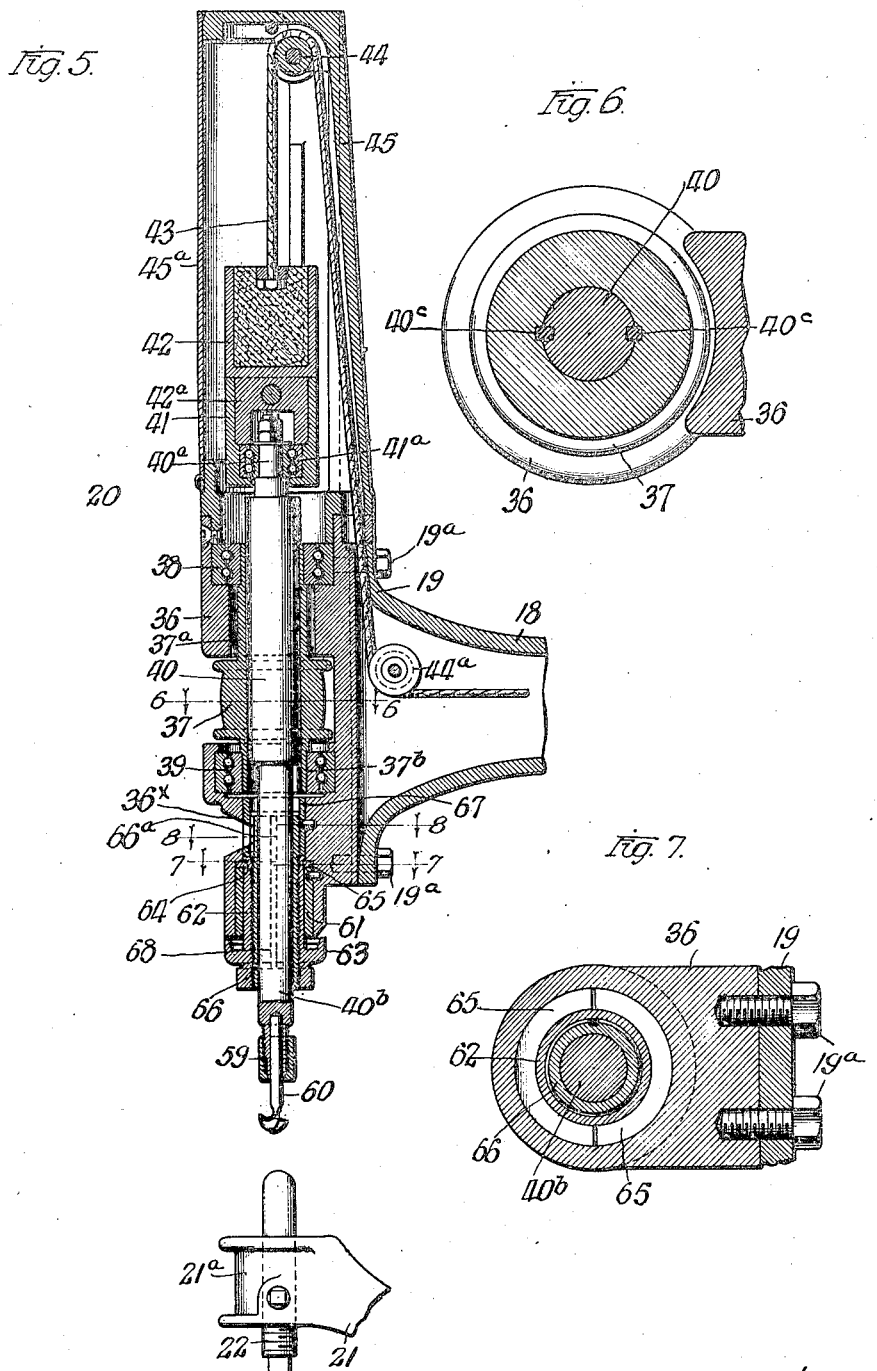

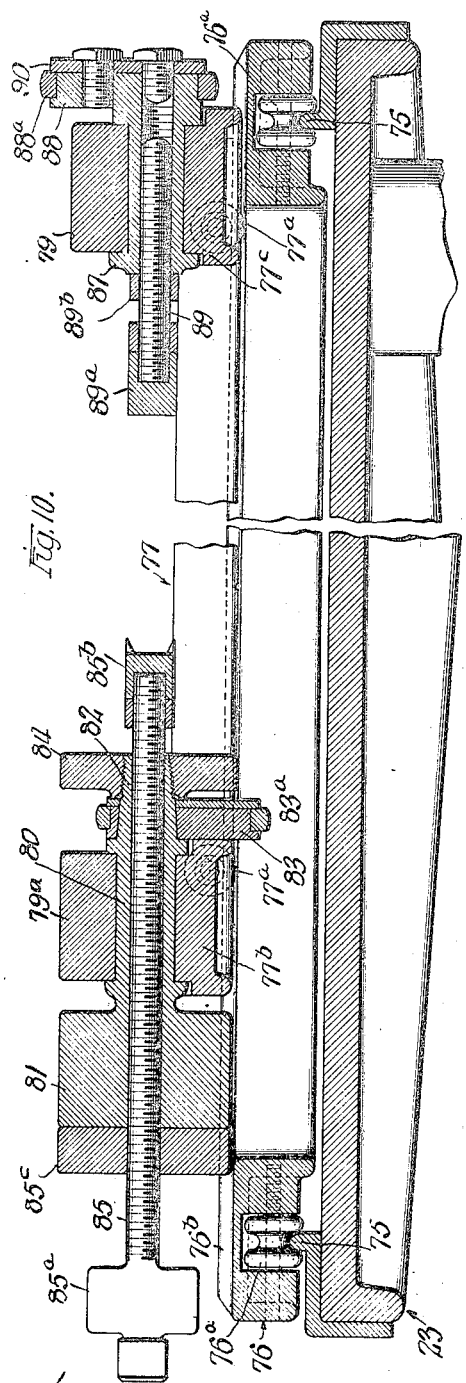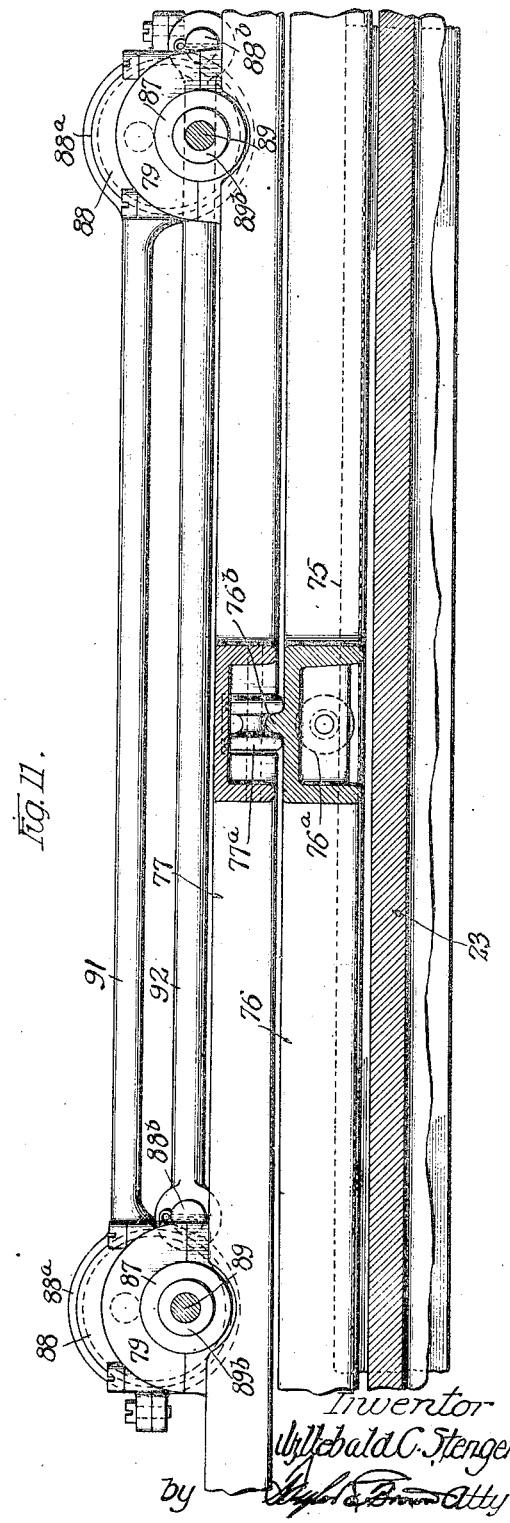

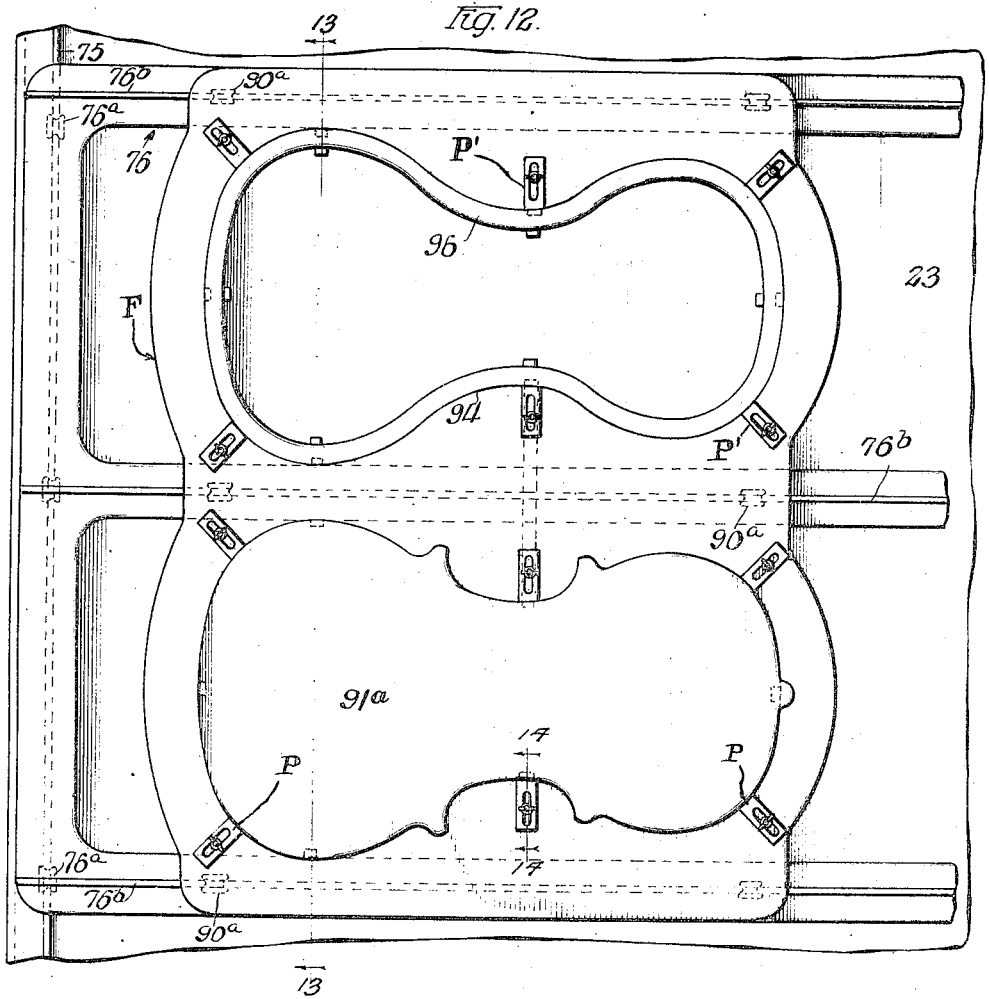

1,440,184

UNITED STATES PATENT OFFICE.

WILLEBALD C. STENGER, OF CHICAGO, ILLINOIS.

CARVING MACHINE.

Application filed March 10, 1920. Serial No. 364,763.

*To all whom it may concern:*

Be it known that I, WILLEBALD C. STENGER, a citizen of the United States, residing at Chicago, in the county of Cook and State of Illinois, have invented certain new and useful Improvements in Carving Machines, of which the following is a specification, reference being had to the accompanying drawings, and to the reference characters marked thereon, which form a part of this specification.

This invention relates to improvements in carving machines and consists of the matters hereinafter described and more particularly pointed out in the appended claims.

The primary object of the present invention is to produce a carving machine that will reproduce precisely, a finished duplicate of any pattern, regardless of its shape, in a minimum length of time and without the use of labor skilled in the art.

Another object of the invention is to provide a carving machine wherein the operating parts are enclosed, thus eliminating to a great extent, vibrations, noise and danger to the operator.

A further object of the invention is to produce a carving machine wherein the co-acting parts may be readily and easily adjusted relative to each other, so that uniformity in the work turned out is assured.

These objects as well as others, together with the several advantages of my improved carving machine, will more fully appear as I proceed with my specification.

In the drawings:

Fig. 1 represents a view in side elevation of a carving machine embodying my invention.

Fig. 2 represents a top plan view of the same.

Fig. 3 represents a view in front elevation of the carving machine.

Fig. 4 represents a view in front elevation, on an enlarged scale, of the tool spindle casing and head stock of the machine, showing the tool holder and tracker.

Fig. 5 represents a central, vertical, sectional view through the tool spindle casing and head stock and associated parts.

Fig. 6 represents, on an enlarged scale, a transverse, sectional view through the head stock, the plane of the section being indicated by the line 6—6 of Fig. 5, looking in the direction indicated by the arrows.

Fig. 7 represents a similar sectional view, the plane of the section being indicated by the line 7—7, looking in the direction indicated by the arrows.

Fig. 8 represents a similar sectional view, the plane of the section being indicated by the line 8—8, looking in the direction indicated by the arrows.

Fig. 9 represents a fragmentary view, in rear elevation, of the supporting frame of the carving machine.

Fig. 10 represents on an enlarged scale, a longitudinal, vertical, sectional view through the work table and associated parts, the plane of the section being indicated by the line 10—10 of Fig. 2, looking in the direction indicated by the arrows.

Fig. 11 represents on an enlarged scale, a transverse, vertical sectional view through the work table and associated parts, the plane of the section being indicated by the line 11—11 of Fig. 2, looking in the direction indicated by the arrows.

Fig. 12 is a top plan view, on an enlarged scale, of the work table and associated parts, when the same has been changed to accommodate a work and a pattern, different from that shown in Figs. 2, 10 and 11.

Fig. 13 represents a transverse, vertical sectional view, taken through that form of work table and its associated parts, shown in Fig. 12, the plane of the section being indicated by the lines 13—13 of Fig. 12, looking in a direction indicated by the arrows.

Fig. 14 represents a detailed vertical sectional view on an enlarged scale, the plane of the section being indicated by the line 14—14 of Fig. 12, looking in the direction indicated by the arrows.

Referring now in detail to that embodiment of my invention illustrated in the accompanying drawings: 15 indicates as a whole, a hollow cast metal frame upon which is suitably supported the various operating parts of the carving machine. As shown in this instance, said frame consists of an upright, hollow column 16, preferably rectangular in cross section, which has an outwardly extending horizontal flange 17 at its bottom end that provides a base, and an upwardly and forwardly extending overhanging hollow arm 18 that leads off from the rear, top end of the column and terminates at its free end in an upright head 19 that is adapted to have fixed to it as will presently appear, a tool spindle casing, indicated as a whole at 20. Leading off from the front top end of the column 16 is an upwardly and forwardly extending bracket arm 21 that terminates in a head 21ª. In said head is adjustably arranged, an upright post 22 that is axially aligned with the tool spindle in the casing 20.

Normally resting near its center, upon the head 21ª is a horizontally disposed, rectangular work table 23, which is suitably supported near its front and rear edges upon the top ends of brace bars 24 that are fixed at their bottom ends to the sides of the hollow column 16. This work table is of such size and plan area that its rear edge approximately engages the overhanging arm 18, and said table is provided with a hole or socket into which the post 22 normally extends. Said table is so supported with reference to the frame 15, that it may be removed therefrom when it is so desired.

As before stated, the column 16 is hollow and in said column is located and adjustably supported, a motor 25 that drives the carving machine as a whole. As shown, said motor is mounted upon a horizontal platform 26 that projects into the column 16 through an opening 27 (see Fig. 9), in the rear wall of said column. The platform 26 has a depending, vertical flange 28 that engages the rear wall of the column 16 and in said flange 28 are spaced, vertical slots 29 through which lag screws 30 extend, which have screw threaded engagement in said rear wall of the column 16. An adjusting screw 31 which is threaded through a block 32, fixed on the rear wall of the column, engages the bottom edge of the vertical flange 28. When it is desired to raise or lower the motor platform 26, the lag screws 30 are loosened and the adjusting screw 31 rotated to either raise or lower said platform, the lag screws 30 again being tightened to hold the platform in the desired adjusted position.

Also mounted on the platform 26 within the column 16 and driven by the motor 25 is a suction fan 33. A conduit 34 that terminates at its top end in a mouth piece 34ª located in a position above the work table 23 is operatively connected to the inlet side of the fan 33, there being a suitable, elongated hole 16ª (see Fig. 1) in the left hand side wall of the column through which the conduit 34 extends in a manner accommodating any adjustment of the platform 26 upon which the fan 33 is mounted. The fan 33 has a discharge nozzle 33ª that projects through the platform 26 so as to discharge such dust, chips and shavings as are sucked or drawn from the work table 23 into the bottom end of the hollow column 16. A door 16ᵇ is provided in the right hand side wall of the column 16 through which the accumulation of dust, chips and shavings may be removed. A second door 16ᶜ is provided in the front wall of said column for the purpose of inspection and repair.

Made integral with the overhanging arm 18 of the frame 15 on its rear side is a bearing lug 18ª that provides in a suitable manner, a bearing for a pair of pulleys 18ᵇ. About these pulleys and a pulley 25ª on the armature shaft of the motor 25 is trained a belt 35 (indicated in dotted lines in Fig. 1) that drives the tool spindle of the carving machine as a whole, as will presently be described.

The drill spindle casing 20 as a whole (see Fig. 5) includes a substantially tubular upright head stock 36 that is attached to the front flat face of the head 19 of the overhanging arm 18, by suitable bolts 19ˣ. In said head is arranged a driven pulley 37 that has top and bottom tubular hubs 37ª, 37ᵇ, which have fixed to them, parts of antifriction bearings 38, 39. The other parts of said antifriction bearings are so fixed in the head stock 36 as to provide the proper rotative and supporting bearing for the pulley 37 which is driven by the belt 35 before mentioned. Rotative with, but capable of an endwise movement in said driven pulley 37, is a tool spindle 40 which has top and bottom end parts 40ª, 40ᵇ, of reduced diameter. The operative connection between the pulley 37 and the tool spindle is provided for in this instance by means of key ways in the said pulley and spindle respectively and associated keys 40ᶜ.

The top end 40ª of the spindle 40 is rotatively supported in a bearing sleeve 41, that is adapted to embrace and is fixed to the bottom end 42ª of a balance weight member 42. As shown, a suitable antifriction bearing device 41ⁿ is interposed between the top end of the spindle and the bearing sleeve 41. The balance weight member 42 has anchored to it a flexible cable 43 that is trained about a sheave 44 journaled in the top end of a housing 45 that is fixed to the top end of the head stock 36. The cable 43 extends downwardly from the pulley 44, through openings in the bottom end of the housing 45 and in the top end of the head 19 respectively (see Fig. 5) to be then trained about sheaves 44ª suitably mounted in the interior of the frame 15, to be attached at its bottom end to the inner end of a counter weighted foot lever 46 that is pivoted at its middle to the front wall of the column 16 in such manner that its outer end is without the column and in a location convenient for the operator. The lever 46 has fixed to its inner end, a counter weight 46ª which acts through the cable 43, when the operator's foot is removed from the lever 46, to elevate and hold the tool spindle 40 in a position above that of the work being operated upon. Thus should the operator be called away from his work for any reason, the tool spindle will be automatically removed from operative engagement with the work.

The housing 45 includes a semi-cylindric sheet metal front cover plate 45ª that is hinged at its top end to the top end of the housing, the parts being so constructed as to provide on one side (the right side in this instance) a slot 47, the purpose of which will presently appear.

Fixed with respect to and vertically movable with the bearing sleeve 41 and associated tool spindle 40, is a tracer arm, indicated as a whole by the numeral 50 (see Figs. 1, 3 and 4). This tracer arm as a whole comprises an L-shaped bar 51 that is fixed at its top end in a block 52 that has a laterally extending stud 53 which extends through the slot 47 between the two parts of the housing 45 to be securely fixed to and to fix together the bearing sleeve 41 and the bottom part of the weight member 42. The outer end of the horizontal arm of the L-shaped bar 51 has secured to it, a second block 52ª which in turn is securely attached to the top end of an upright tracer spindle 54. In the bottom end of the tracer spindle is adjustably fixed a tracer or follower 55, the head of which is rounded to more easily follow the pattern to be reproduced upon the work. The ends of the L-shaped bar 51 are rigidly braced by means of a diagonally arranged bar 56 which is fixed respectively to the block 52 and to the top end of the tracer spindle 54. The upright arm of the L-shaped bar 51 has vertically sliding bearing in the lug 57ª made integral with an L-shaped bearing arm 57 which is attached to the side of the head stock 36. This bearing arm 57 has a bearing sleeve 57ᵇ at its outer end, through which the tracer or follower spindle 54 has vertical sliding bearing. Thus when vertical movement is imparted to the tool spindle 40, a similar movement is imparted to the tracer spindle 54.

In the bottom end of the tool spindle 40 and secured by means of a suitable chuck 59, is a carving or cutting tool 60 which is fully illustrated and described in Letters Patent of the United States, No. 1,330,287, issued to me on February 10, 1920, and which it is herein thought unnecessary to describe in detail. Means are provided for imparting a micrometer adjustment in a vertical direction to said cutting tool, with reference to the work operated upon and with reference to the tracer spindle, so that absolute precision is attainable, in the cut to be taken upon the work operated upon. Said adjusting means are as follows:

Non-rotatively fixed in a recess in the bottom of the head stock 36 is a sleeve 61 (see Fig. 5) that provides rotative bearing for the tubular body part 62 of a micrometer adjusting nut 63 that has suitable indicia upon its periphery. The body part 62 of said nut is interiorly threaded and near its top end has an annular groove 64 in which is engaged a split ring 65 that is interposed between the top end of the bearing sleeve 62 and a shoulder formed in said head stock. An exteriorly threaded bushing 66 surrounds the reduced bottom end 40ᵇ of the tool spindle 40, the threads of the bushing being engaged by the threads of the micrometer nut body 62 before mentioned.

The top end of the bushing 66 engages in a second sleeve 67 of a diameter smaller than that of the sleeve 61 before mentioned, the sleeve 67 being fixed in the head stock 36 just below the antifriction bearing 39 for the driven pulley 37. A key or spline 68 (see Fig. 8) fixed in the sleeve 67 engages in a vertical groove 69 formed in the bushing 66. Consequently when rotative movement is imparted to the micrometer nut 63 only a vertical movement is imparted to the sleeve 67, the top end of which is adapted to be engaged by the shoulder at the junction of the main part of the spindle 40 and its lower reduced part 40ᵇ, to limit the downward movement of said spindle.

The front face of the head stock 36 is cut away to provide a sight opening 36ˣ in line with a similar opening in the sleeve 57, to present to the observer indicia on the flattened front face 66ª of the bushing 66. A suitable mark is provided in one wall of the opening 36ˣ which co-acts with the indicia on the bushing 66 for the purpose of indicating such adjustments as are made upon the rotation of the micrometer nut 63.

I have illustrated my improved carving machine as being used in the production of bodies for musical instruments,—in this case, violins. This is only for the purpose of illustration and description as it is apparent that my improved carving machine may be used for and upon other kinds of work where its peculiar features make it advantageous to do so.

In Figs. 1, 2, 3, 10 and 11, I have illustrated the machine as being used in the production of "necks" for violins, and in Figs. 12, 13 and 14, I have shown the machine as being used in the production of "fronts" and "backs" for violin bodies. It will be observed as hereafter described, that a mere substitution of one pattern and work holding frame for another is all that is necessary to make the change from a machine for producing "necks" to a machine for producing "fronts" and "backs" for violin bodies.

To this end I provide upon the table 23, a plurality of frames which so co-act with each other as to be capable of a universal movement in a horizontal plane with reference to the tool 60 and the tracer 55. As shown, the table 23 has transversely extending front and rear rails 75, 75, upon which is movably mounted an open, rectangular carriage frame 76. This frame has rollers 76ª journaled in its bottom side that bear upon said rails on the table 23. On the top surface of the carriage frame 76, are spaced, longitudinally extending rails 76ᵇ upon which travels a pattern and work holding frame 77, suitable rollers 77ª being provided in the bottom surface of the said frame, which engage upon the rails 76ᵇ of the carriage frame. In proportion I preferably make the carriage frame and the work holding frame, each one-half as wide as the table 23, and I preferably make the pattern and work holding frame 77 approximately half as long as the carriage frame 76 (see Fig. 2).

In said last mentioned figure, 78 indicates a pattern, in this case a "violin neck" and 78ª indicates an elongated block of wood which is to be operated upon and from which will be duplicated a violin neck of the same shape and proportions as that of the pattern 78. Both the pattern 78 and the block or "work" 78ª are so mounted in parallel relation in the frame 77 that when the pattern 78 is rotated manually to present new surfaces to the tracer 55, a similar rotation of the work block 78ª is attained so that the cutting tool 60 may reproduce thereon the exact contour of the surfaces of the pattern 78. As the means for holding the work block is the same as that for holding the pattern, a description of one will suffice for both.

The pattern 78 is mounted in said frame as follows: On the front and rear members 77ᵇ and 77ᶜ of the pattern frame 77, are secured bearing blocks 79, 79ª (see Figs. 2 and 10). In the front bearing block 79ª is rotatively mounted a bearing sleeve 80 which has a knurled head 81 at its outer end by means of which the sleeve may be rotated when so desired. The inner end 82 of the sleeve is tapered to receive an eccentric disc 83, a lock nut 84 clamping said disc upon the bearing sleeve 80. The bearing sleeve 80 is interiorly threaded to receive a thumb screw 85 which has a head 85ª at its outer end whereby it may be manipulated, and a member 85ᵇ at its inner end which is adapted to bite into the associated end of the pattern 78 (or block 78ª). A lock nut 85ᶜ locks the screw 85 in the desired position with reference to the sleeve 80. A rod 86 connects the eccentric collar 83ª of the eccentric 83 with the like eccentric 83 associated with the work block 78ª.

In the bearing block 79 is rotatively mounted a sleeve 87 that has an integral eccentric 88 formed at its rear end. This sleeve is interiorly threaded to receive a screw 89 in axial alignment with the screw 85 in the sleeve 80 before mentioned. The screw 89 has a head 89ª that is adapted to engage the other end of the pattern 78 and a lock nut 89ᵇ holds the screw 89 in the desired, adjusted position.

A strap 88ª surrounds the eccentric 88 and is held in place thereon by a disc 90. A rod 91 operatively connects the eccentric 88 associated with the pattern 78 to the like eccentric 88 associated with the work block 78ª. Each eccentric 88 is provided with a stud 88ᵇ (see Fig. 11) which are arranged at an angle of 90° with reference to the center of the said eccentrics and a rod 92 operatively connects said studs together. By reason of this off-setting arrangement there is no "dead center" position of the slowly moving eccentric 88. It will therefore be understood that by reason of the rods 91 and 92 operatively connecting, as described, the eccentric on the sleeve 87 in one block 79 with the sleeve in the other block 79, any adjustment of one connection will be automatically made upon the other.

To secure a pattern in place, the lock nut 85ᶜ is loosened and the screw 85 is actuated to move the same outwardly. The scroll end of the pattern is engaged with the head 89ª of the screw 89, and the butt end of the neck is brought into alignment with the screw 85 which is now actuated to move the same inwardly towards the said butt end of the pattern until the member 85ᵇ bites into said butt end. The lock nut 85ᶜ is actuated to hold the screw 85 in this last mentioned position. The work block 78ª is inserted in place in the same manner. When the thumb nut 81 of the sleeve 80 is rotated, the screw 85 will rotate with it, which in turn will rotate the pattern and the other bearing sleeve 87 so as to present the entire contour of the pattern to the tracer 55. Through the connections before mentioned it is apparent that when the pattern is thus rotated, the work block 78ª is rotated in the exact proportion so that as the tracer follows about the contour of the pattern, the cutting tool 60 will cut away the block 78ª and reproduce the contour of the pattern upon the block 78ª to produce a neck which is identical in form with the pattern neck 78.

In Figs. 12, 13 and 14, I have shown a pattern and work supporting frame F, that is adapted to be substituted for the pattern and work holding frame 77 upon the carriage frame 76, whenever it is desired to reproduce comparatively flat work, after comparatively flat patterns, which as shown in this instance, is the "back" of the violin.

The frame F is provided with rollers 90ª which engage upon the tracks 76ᵇ of the carriage frame in the same manner as the rollers of the pattern and work holding frame 77 before described. The violin "back" pattern which is indicated at 91ª is placed in position upon the frame F and suitably held thereon by adjustable clamping plates P that engage the edges of the pattern back. Preferably, the frame F is cut away below the area occupied by the pattern, to provide an opening 93 of a contour approximating the outline of the largest size pattern that can be reproduced by the carving machine. A similar opening 94 is also provided in this frame, over which the work to be operated upon is placed and locked in position by adjusting plates P' similar to the plates P before mentioned. Should it be desired to reproduce a smaller back, a template or filler ring may be placed in the opening 93 and a similar template or filler ring 96 may be placed in the opening 94, the frame being made to suitably support such templates or filler rings.

After the pattern and work piece are fixed in said frame, the same is shifted horizontally to bring the tracer into following engagement with the edge of the pattern, the cutting tool 60 describing a like outline upon the work piece.

Should it be desired to operate in any manner upon the inner surface of said back, or upon any other surface wherein it would be inconvenient to place the same upon either of the frames 77 or F, these frames and likewise the table 23 may be easily and quickly removed from the frame 15 after which the post 22 will provide a suitable support, which work of course must be held in the hands of the operator and moved about the top end of the post as a support to present such surface to the cutting tool as he may see fit.

The part 22 is made adjustable in the head $21^a$ of the arm 21 so that there will be no need of changing or disturbing the micrometer adjustment of the tool spindle 40. When so desired, the table 23 may be again replaced and of course with it, the various carriage and other frames.

The operation of my improved carving machine is as follows: The motor 25 is started in any familiar manner to drive the tool spindle 40 through the pulley 37 and belt 35, said motor of course also driving the suction fan 33. The pattern and work block are locked in their proper frame, the tool 60 of course having heretofore been adjusted with reference to the work and to the tracer. The operator depresses the foot lever 46 and this lowers the tracer and tool into proper engagement with the pattern and work which are shifted horizontally upon the table so that the tracer will follow the pattern and the tool will reproduce from the work block an exact duplicate of said pattern. Such chips or shavings and dust as are made by the tool are drawn into the mouth piece $34^a$ of the conduit 34 to be delivered into the bottom of the hollow column 16. When the operator releases the pressure upon the lever 46, the weight $46^a$ will, through the flexible cable, act to elevate the spindle 40 and with it the tracer 55, into a position removed from the work block and pattern.

My improved carving machine possesses many advantageous features. Should the driving belt 35 develop a slack, this slack may be compensated for by adjusting the motor and fan supporting bracket 26 in the manner before described.

The driving motor is located within the column in a manner forming an enclosed housing therefor, thus protecting the motor from accidents and eliminating to a great extent, the humming noise thereof and vibrations.

No clips or shavings can accumulate upon the table, to hinder the universal movement of the pattern and work frame, or to obscure the pattern and work block in any manner, because these chips are drawn into the mouth piece $34^a$ to be deposited in the bottom end of the hollow column 16, from which they may be removed through the doorway closed by the door $16^b$.

By means of the construction of the head stock and follower arm, the tracer 55 and the tool 60 are capable of moving vertically in unison and one may be adjusted with reference to the other and to the pattern and work block so that absolute precision is obtained in each and every piece of work turned out by the machine.

Should the operator momentarily forget himself and remove his foot from the controlling lever, no harm can result therefrom, as the tool and tracer will be automatically elevated from the pattern and work, into a position inoperative with respect thereto.

The construction of the table, the carriage frame and the pattern and work holding frame, is such that a free universal movement of the pattern and work, with reference to the tracer and cutting tool is provided for, and furthermore, the pattern and work holding frame is capable of being substituted upon the carriage frame for another pattern and work holding frame, thus permitting of an interchange of parts so that different kinds of work may be readily accommodated for.

While in describing my invention, I have referred to certain details of mechanical construction and arrangement of parts, I do not wish to be limited thereto except as may be pointed out in the appended claims.

I claim as my invention:

1. In a carving machine, the combination with a machine frame having a horizontally disposed supporting table and a vertically disposed fixed tool casing, of a cutting tool and a tracer associated therewith, a support for the cutting tool and tracer, said support being mounted in the casing, a pattern and work holding frame, and means for imparting universal movement in a horizontal plane to said work holding frame relative to the cutting tool and tracer.

2. In a carving machine, the combination with a machine frame having a horizontally disposed supporting table and a vertically disposed fixed tool casing, of a cutting tool and a tracer associated therewith, a support for the cutting tool and tracer, said support being mounted in the casing, a pattern and work holding frame, and means for imparting universal movement in a horizontal plane to said work holding frame relative to the cutting tool and tracer, said means including a movable frame intermediate the table and the work holding frame, parallel transversely disposed tracks on the upper surface of the table, longitudinally disposed parallel tracks on the upper surface of the intermediate frame, track engaging devices on the lower surface of the intermediate frame and track engaging devices on the lower surface of the work holding frame.

3. In a carving machine, the combination with a machine frame having a horizontally disposed supporting table and a vertically disposed fixed tool casing, of a cutting tool and a tracer associated therewith, a support for the cutting tool and tracer, said support being mounted in the casing, a pattern and work holding frame, and means for imparting universal movement in a horizontal plane to said work holding frame relative to the cutting tool and tracer, and means for rotating the cutting tool.

4. In a carving machine, the combination with a machine frame having a horizontally disposed supporting table and a vertically disposed fixed tool casing, of a cutting tool and a tracer associated therewith, a support for the cutting tool and tracer, said support being mounted in the casing, a pattern and work holding frame, and means for imparting universal movement in a horizontal plane to said work holding frame relative to the cutting tool and tracer, said means including a movable frame intermediate the table and the work holding frame, parallel transversely disposed tracks on the upper surface of the table, longitudinally disposed parallel tracks on the upper surface of the intermediate frame, track engaging devices on the lower surface of the intermediate frame and track engaging devices on the lower surface of the work holding frame, and means for rotating the cutting tool.

5. In a carving machine, the combination with a machine frame having a horizontally disposed supporting table and a vertically disposed fixed tool casing, of a cutting tool and a tracer associated therewith, a support for the cutting tool and tracer, said support being mounted in the casing, a pattern and work holding frame, and means for imparting universal movement in a horizontal plane to said work holding frame relative to the cutting tool and tracer, means for rotating the cutting tool and means for imparting vertical movement to the cutting tool and the tracer.

6. In a carving machine, the combination with a machine frame having a horizontally disposed supporting table and a vertically disposed fixed tool casing, of a cutting tool and a tracer associated therewith, a support for the cutting tool and tracer, said support being mounted in the casing, a pattern and work holding frame, means for imparting universal movement in a horizontal plane to said work holding frame relative to the cutting tool and tracer, said means including a movable frame intermediate the table and the work holding frame, parallel transversely disposed tracks on the upper surface of the table, longitudinally disposed parallel tracks on the upper surface of the intermediate frame, track engaging devices on the lower surface of the intermediate frame and track engaging devices on the lower surface of the work holding frame, means for rotating the cutting tool and means for imparting vertical movement to the cutting tool and the tracer.

7. In a carving machine, the combination with a machine frame having a horizontally disposed supporting table and a vertically disposed fixed tool casing, of a cutting tool and a tracer associated therewith, a support for the cutting tool and tracer, said support being mounted in the casing, a pattern and work holding frame, means on said last mentioned frame for securing the pattern and the work thereto, and means for imparting universal movement in a horizontal plane to said work holding frame relative to the cutting tool and tracer.

8. In a carving machine, the combination with a frame having a horizontally disposed supporting table and a vertically disposed, fixed tool casing, of a cutting tool and a tracer associated therewith, a support for the cutting tool and tracer, said support being mounted in the casing, a pattern and work holding frame on the supporting table, means on said last mentioned frame for securing the pattern and the work thereto, and means imparting universal movement in a horizontal plane to said work holding frame relative to the tool and the tracer, said means including a movable frame intermediate the table and the work holding frame, parallel transversely disposed tracks on the upper surface of the table, longitudinally disposed parallel tracks on the upper surface of the intermediate frame, track engaging devices on the lower surface of the intermediate frame and track engaging devices on the lower surface of the work holding frame.

9. In a carving machine, the combination with the machine frame having a fixed support, and a horizontally disposed table, a cutting tool, of an upright rotatable cutting tool and a tracer associated therewith, a support for the cutting tool and tracer, said support being mounted in the casing, a pattern and work holding frame mounted on the table, means for imparting universal movement to the work holding frame relative to said cutting tool and tracer and a suction device mounted on said machine frame and having a receiving mouthpiece arranged near said cutting tool.

10. In a carving machine, the combination with a machine frame having a horizontally disposed supporting table and a vertically disposed fixed tool casing, of a cutting tool and a tracer associated therewith, a support for the cutting tool and tracer, said support being mounted in the casing, a pattern and work holding frame, means for imparting universal movement in a horizontal plane to said work holding frame relative to the cutting tool and tracer, means for rotating the cutting tool, means for imparting vertical movement to the cutting tool and the tracer, and means associated with the tool holding spindle providing a micrometer adjustment of the spindle with reference to the pattern and work holding frame.

11. In a carving machine, in combination with an upright, hollow support, a rotating cutting tool and a tracer associated therewith, mounted on said support, a pattern and work holding frame mounted on said support below said cutting tool and associated tracer, and capable of a universal movement in a horizontal plane, a motor and a suction device driven thereby, located within said upright, hollow support, said motor also driving said cutting tool, and a conduit operatively connected to said suction device and having a mouth piece located adjacent said cutting tool.

12. In a carving machine, in combination with an upright, hollow support, a rotating cutting tool and a tracer associated therewith, mounted on said support, a pattern and work holding frame mounted on said support below said cutting tool and associated tracer and capable of a universal movement in a horizontal plane, a bracket within said upright, hollow support, and capable of being adjusted vertically therein, a motor and a suction device driven thereby mounted on said bracket, said motor also driving said cutting tool, and a conduit operatively connected to said suction device and having a mouth piece located adjacent said cutting tool.

13. In a carving machine, in combination with an upright, hollow support, a rotating cutting tool and a tracer associated therewith, mounted on said support, a pattern and work holding frame mounted on said support below said cutting tool and associated tracer and capable of a universal movement in a horizontal plane, a motor and a suction device driven thereby, located within said upright hollow support, a conduit operatively connected to said suction device and having a mouth piece located near said cutting tool, a foot treadle pivoted on said hollow support, and means within said support and operatively connecting said cutting tool and foot treadle, for raising and lowering said cutting tool away from and towards said pattern and work holding frame when said foot lever is actuated.

14. In a carving machine, in combination with a support, a casing thereon, a rotative, vertically adjustable cutting tool mounted on the support, a tracer arm associated with the cutting tool and a tracer adjustably mounted in said arm, of a table mounted on the support in a plane below the casing, pattern and work holding frames, movable on said table, a foot lever pivotally mounted on the support, a cable operatively connecting the foot lever and said tool to lower the latter to its work when the lever is actuated by the operator.

15. In a carving machine, in combination with a support, a casing thereon, a rotative, vertically adjustable cutting tool mounted on the support, a tracer arm associated with the cutting tool and a tracer adjustably mounted in said arm, of a table mounted on the support in a plane below the casing, pattern and work holding frames movable on said table, a foot lever pivotally mounted on a support, a cable operatively connecting the foot lever and said tool, and means associated with said lever to normally hold said cutting tool and tracer in a plane above that of the pattern and work holding frames.

In testimony that I claim the foregoing as my invention I affix my signature in the presence of two witnesses, this 8th day of March, 1920.

WILLEBALD C. STENGER.

Witnesses:
L. PERLOW,
B. L. MACGREGOR.